United States Patent
Lin

(10) Patent No.: US 7,417,854 B2
(45) Date of Patent: Aug. 26, 2008

(54) COMPUTING DEVICE HAVING MULTIPLE ENCLOSURES

(75) Inventor: Teng-Feng Lin, San Chung (TW)

(73) Assignee: East Best Co., Ltd., Taipei Hsien (TW)

( * ) Notice: Subject to any disclaimer, the term of this patent is extended or adjusted under 35 U.S.C. 154(b) by 280 days.

(21) Appl. No.: 11/298,672

(22) Filed: Dec. 12, 2005

(65) Prior Publication Data

US 2007/0133163 A1   Jun. 14, 2007

(51) Int. Cl.
*G06F 1/16*   (2006.01)

(52) U.S. Cl. .......................... 361/685; 235/375; 211/26

(58) Field of Classification Search .................. 360/46, 360/51; 361/695–697, 709, 679–687, 724–727; 353/15; 235/375; 211/26
See application file for complete search history.

(56) References Cited

U.S. PATENT DOCUMENTS

| | | | |
|---|---|---|---|
| 4,680,674 A * | 7/1987 | Moore | 361/686 |
| 5,949,644 A * | 9/1999 | Park | 361/686 |
| 6,597,569 B1 * | 7/2003 | Unrein | 361/687 |
| 2003/0067699 A1 * | 4/2003 | Thomson et al. | 360/46 |

* cited by examiner

*Primary Examiner*—Hung V Duong
(74) *Attorney, Agent, or Firm*—Leong C. Lei

(57) ABSTRACT

A computing device whose components are separately housed in a main enclosure and at least a secondary enclosure is provided herein. The motherboard, power supply, adaptor card, hard disk drive, etc., are housed in the main enclosure while the peripheral storage devices of the computing device such as optical disk drives and hard disk drives are placed in at least a secondary enclosure. An appropriate signal link is maintained between the main enclosure and the secondary enclosure so that the components in the main enclosure could access the peripheral storage device in the secondary enclosure. Additionally, the secondary enclosure could be connected to another device such as a second computer or a TV so as to share the peripheral storage device in the secondary enclosure.

4 Claims, 3 Drawing Sheets

COMPUTING DEVICE HAVING MULTIPLE ENCLOSURES

BACKGROUND OF THE INVENTION (a) Technical Field of the Invention

The present invention generally relates to computing devices, and more particularly to a computing device housed in a master enclosure and at least a secondary enclosure.

(b) Description of the Prior Art

A general computing device such as a common desktop computer usually has its main components such as the motherboard, power supply, adaptor card, hard disk drive, and optical disk drive, housed in an enclosure, and has its input/output devices such as the monitor, keyboard, and mouse externally connected to the enclosure and the components inside the main enclosure. In recent years, the line drawn between a computer and a home appliance is getting blurred. For example, most computers now could play DVD disk and show the content of the DVD disk on the computer's monitor. And there are digital recording appliances that could save the recorded programs in an internal hard disk drive. It would therefore naturally occur to people that some form of resource sharing between a computer and an appliance, if possible, would definitely be quite convenient and economical. For example, a single DVD drive is connected to both a computer and a TV for playing the content of a DVD either on the computer's monitor or on the TV. Similarly, a digital recording appliance could save its recording on a computer's hard disk, instead of its own internal hard disk.

The redundant investment on same hardware components would get worse as there are more computers, each having its own dedicated resources such as the DVD player and the hard disk drive. However, the conventional way of housing a computer inherently prevents its sharing resources with other computers or appliances. The conventional single-enclosure housing is also very bulky to sit in the living room of a household and does not quite fit in the decoration of the living room.

SUMMARY OF THE INVENTION

The primary purpose of the present invention is to provide a computing device whose components are separately housed in different enclosures. The computing device contains a main enclosure and at least a secondary enclosure. The motherboard, power supply, adaptor card, hard disk drive, etc. are housed in the main enclosure while the peripheral storage devices of the computing device such as optical disk drives and hard disk drives are placed in at least a secondary enclosure. An appropriate signal link is maintained between the main enclosure and the secondary enclosure so that the components in the main enclosure could access the peripheral storage device in the secondary enclosure. Additionally, the secondary enclosure could be connected to another device such as a second computer or a TV so as to share the peripheral storage device.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
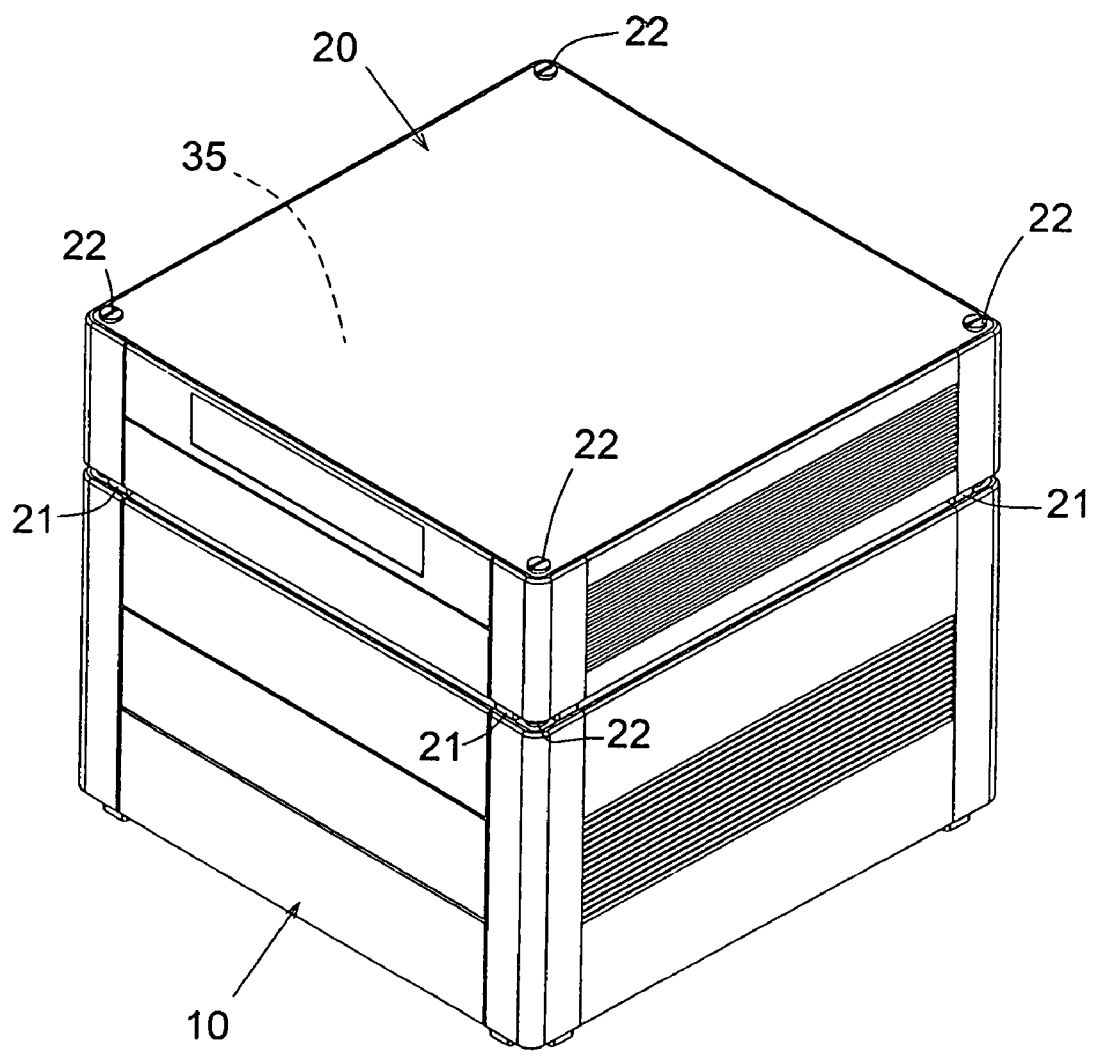
FIG. 1 is a perspective diagram showing the appearance of the computing device according to an embodiment of the present invention.
Figure 2:
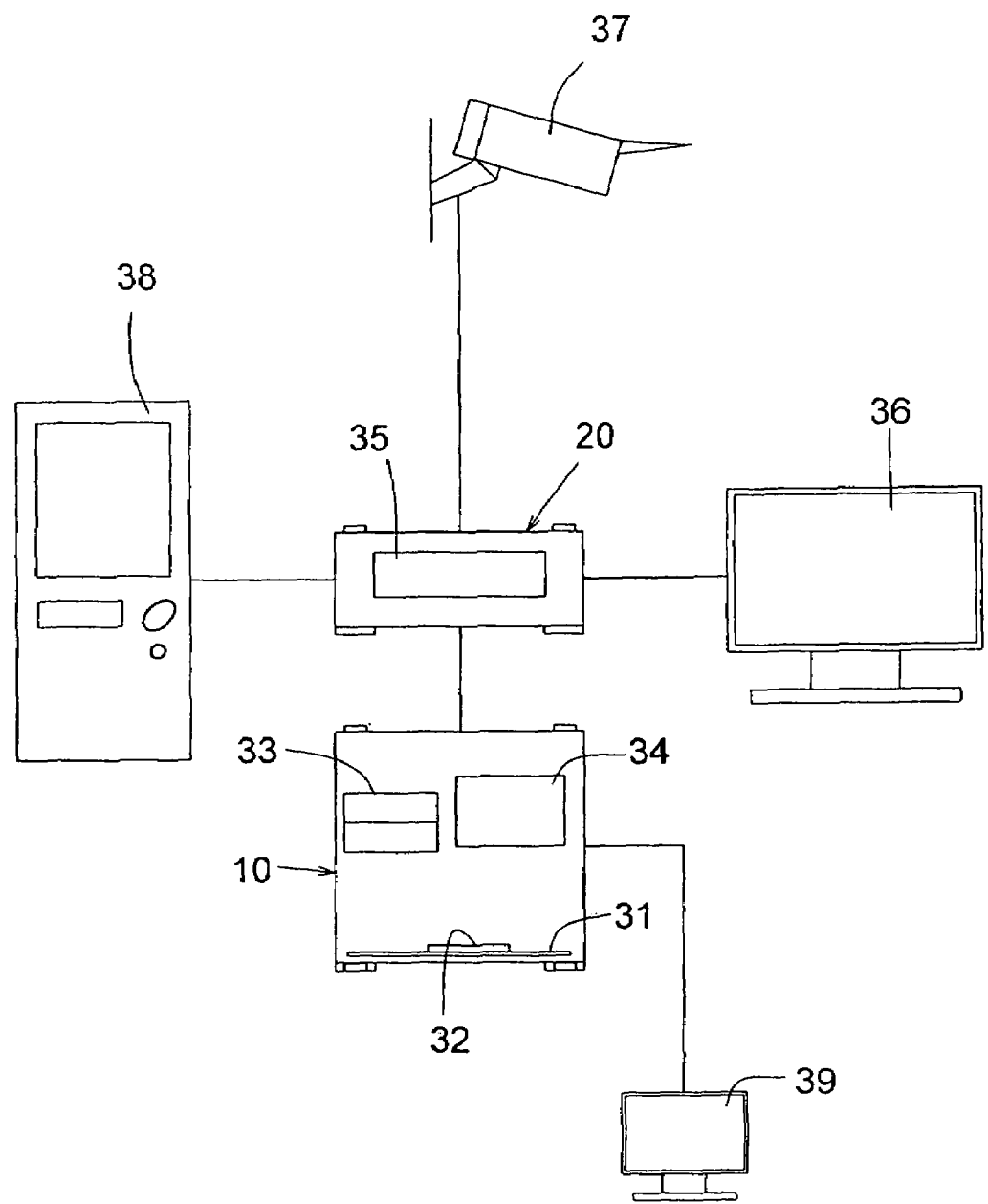
FIG. 2 is a schematic diagram showing an application scenario of the present invention.
Figure 3:
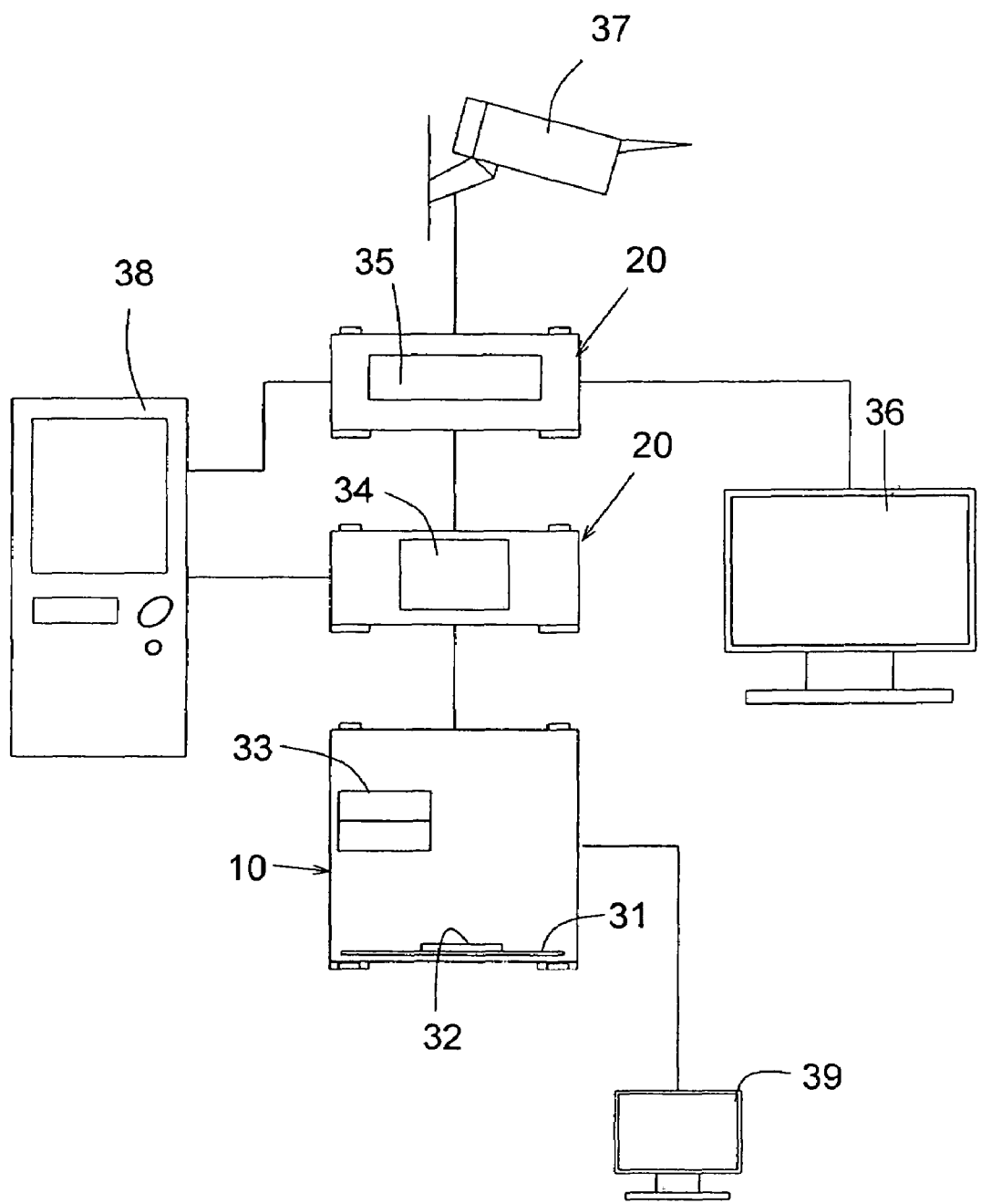
FIG. 3 is a schematic diagram showing another application scenario of the present invention.

As shown in FIGS. 1 to 3, the computing device according to an embodiment of the present invention is housed in a master enclosure 10 and at least a secondary enclosure 20. The computing device is essentially a general computer having all the components commonly found in a computer. However, according to the present invention, the motherboard 31, central processing unit (CPU) 32, hard disk drive 33, power supply 34, etc., commonly found in a general computer are housed inside the main enclosure 10. On the other hand, each of the secondary enclosure 20 contains at least a peripheral storage device such as the optical disk drive 35 and a first interface connector (not shown) for the peripheral storage device. An appropriate signal link (not numbered) is connected between the main enclosure 10 and the first interface connector of the secondary enclosure 20 so that the computer housed in the main enclosure 10 could access the media content of the peripheral storage device housed in the secondary enclosure 20. The secondary enclosure 20 also has a second interface connector for establishing another signal link to a second device such as a TV 36, a surveillance camera 37, etc. The secondary enclosure 20 could also be connected to another computer 38 so that the computer 38 could access the media content of the peripheral storage device housed in the secondary enclosure 20.

In addition to the motherboard 31, central processing unit (CPU) 32, hard disk drive 33, power supply 34, the main enclosure 10 could further contain adaptor cards such as display or audio cards, and heat dissipation devices such as fans. In short, the components housed inside the main enclosure 10 constitute a fully functional computer running a Linux or a Microsoft® operating system. The present invention does not impose any constraint on the choice of operating system. In addition, the main enclosure 10 has the externally connected input/output devices such as the monitor 39.

The peripheral storage device installed inside the secondary enclosure 20 could be an optical disk drive 35 such as a DVD drive, DVD-RW drive, etc., or a hard disk drive 33. The present invention does not impose any constraint on the choice of peripheral storage device. In an alternative embodiment, the power supply 34 is removed from the main enclosure 10 and installed in a separate secondary enclosure 20 having an appropriate power link to the main enclosure 10 so as to provide the electricity required by the main enclosure. The secondary enclosure 20 with the power supply 34 could also be connected to other devices such as the second computer 38 so that the two computers share the same power supply 34. This design not only is an economical approach but also provide a cooler and thereby more stable operating environment for the components running in the main enclosure 10.

According to the present embodiment, the main enclosure 10 and the secondary enclosure 20 are all in a cubic form with a number of first latch elements 21 on the bottom surface and a number of matching second latch elements 22 at corresponding locations on the top surface. As a result, the enclosures 10 and 20 could be stacked in any order with an upper enclosure's first latch elements 21 and the lower enclosure's second latch elements stably holding the enclosures 10 and 20 at their places.

With such a modularized design, the enclosures of the computing device of the present invention could be arranged at a greater degree of freedom. The enclosures 10 and 20 could be stacked together all in one place or they could be positioned at separate places within the reach of their signal links, to fit the user's requirement or the decoration of the living room.

The peripheral storage device in the second enclosure 20 functions independently even the computer in the main enclosure 10 is not turned on. With the second signal link to the TV 36 or other similar display devices, the DVD player or other similar peripheral storage device in the second enclosure 20 could replace a conventional DVD player appliance. Similarly, the hard disk drive in the second enclosure 20 could be connected to the surveillance camera 37 to replace a conventional recorder appliance such as a tape recorder.

As mentioned earlier, the second enclosure 20 could be connected to the main enclosure 10 and a second computer 38 simultaneously. Along with the peripheral storage device's independently operating function, the present invention allows a single set of peripheral storage devices to be shared among computers, saving a user from redundant investment in having dedicated peripheral storage devices separately.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A computing device, comprising:
   a general computer comprising a plurality of components;
   a main enclosure which houses a subset of said plurality of components such that said general computer is independently operable; and
   at least a secondary enclosure which houses at least a peripheral storage device of said plurality of components, and comprises a first interface connector for establishing a first signal link to said main enclosure so that said peripheral storage device is accessible to said components of said main enclosure;
   wherein said secondary enclosure further comprises a second interface connector for establishing a second signal link to a second device.

2. The computing device according to claim 1, wherein each of said main enclosure and said secondary enclosure has a plurality of first latch elements on the bottom surface and a plurality of second latch elements on the top surface at locations corresponding to said first latch elements so that said main enclosure and said secondary enclosure are stacked stably.

3. The computing device according to claim 1, wherein said peripheral storage device is an optical disk drive.

4. The computing device according to claim 1, wherein said peripheral storage device is a hard disk drive.

* * * * *